(12) United States Patent
Surborg et al.

(10) Patent No.: US 12,708,065 B2
(45) Date of Patent: Aug. 18, 2026

(54) PNEUMATIC CONVEYOR DEVICE FOR GRANULAR MATERIAL AND AGRICULTURAL DISTRIBUTING MACHINE

(71) Applicant: LEMKEN GmbH & Co. KG, Alpen (DE)

(72) Inventors: Carsten Surborg, Alpen (DE); Carsten Beier, Salzkotten (DE)

(73) Assignee: LEMKEN GmbH & Co. KG, Alpen (DE)

( * ) Notice: Subject to any disclaimer, the term of this patent is extended or adjusted under 35 U.S.C. 154(b) by 96 days.

(21) Appl. No.: 18/846,857

(22) PCT Filed: Mar. 14, 2023

(86) PCT No.: PCT/DE2023/100189
§ 371 (c)(1),
(2) Date: Sep. 13, 2024

(87) PCT Pub. No.: WO2023/174481
PCT Pub. Date: Sep. 21, 2023

(65) Prior Publication Data

US 2025/0221330 A1 Jul. 10, 2025

(30) Foreign Application Priority Data

Mar. 14, 2022 (DE) ..................... 10 2022 105 904.9

(51) Int. Cl.
*A01C 15/04* (2006.01)
*A01C 15/00* (2006.01)
*B65G 53/66* (2006.01)

(52) U.S. Cl.
CPC ............ *A01C 15/04* (2013.01); *A01C 15/007* (2013.01); *B65G 53/66* (2013.01); *B65G 2812/165* (2013.01)

(58) Field of Classification Search
CPC ....... A01C 15/04; A01C 15/007; A01C 7/082; A01C 5/064; A01C 7/081; A01C 7/084;
(Continued)

(56) References Cited

U.S. PATENT DOCUMENTS 4,779,765 A 10/1988 Neumeyer
5,979,343 A 11/1999 Gregor et al.
(Continued)

*Primary Examiner* — Gene O Crawford
*Assistant Examiner* — Amari J Meddling
(74) *Attorney, Agent, or Firm* — Smartpat PLC

(57) ABSTRACT

A pneumatic conveying device for conveying granular material, in particular seeds and/or fertilizer, includes at least one blower with at least one outlet, to which the at least one main air supply line is connected, into which flows an air flow generated by the blower. The at least one main air supply line leads into an air inlet of an air distribution device for controlling the volumetric air flow. The air distribution device has an even number of air outlets, to which the respective one connecting line is connected, to which a metering device for supplying the granular material is connected. The air distribution device is embodied as a cylindrical housing with a rotary slide valve arranged therein, which is equipped for changing an outlet cross-section of the air outlets in order to manipulate the supplied volumetric air flow for transporting the granular material coming from the respective metering device.

17 Claims, 8 Drawing Sheets

(58) Field of Classification Search
CPC .. A01C 7/046; B65G 53/66; B65G 2812/165; F24F 13/065; F16K 31/041; F16K 1/22; F16K 2200/401; F16K 1/222
See application file for complete search history.

(56) References Cited

U.S. PATENT DOCUMENTS

| | | | | |
|---|---|---|---|---|
| 7,669,538 | B2 | 3/2010 | Memory et al. | |
| 2008/0295751 | A1 | 12/2008 | Shoup et al. | |
| 2021/0127556 | A1 * | 5/2021 | Graham | A01C 7/082 |

* cited by examiner 14
12
15, L4
20, 21
15, L3
24
17
15, L5
29
25
D
25
B
18
28
15, L6
15, L7
25
26
19
22
23
23
23
L
27

PNEUMATIC CONVEYOR DEVICE FOR GRANULAR MATERIAL AND AGRICULTURAL DISTRIBUTING MACHINE

CROSS-REFERENCE TO RELATED APPLICATION

This application is a national stage application, filed under 35 U.S.C. § 371, of International Patent Application PCT/DE2023/100189, filed on Mar. 14, 2023, which claims the benefit of German Patent Application DE 10 2022 105 904.9, filed on Mar. 14, 2022.

BACKGROUND

Granular materials, for example in the form of seeds or fertilizer, are usually transported from at least one storage container to one or multiple dispensing units by means of a conveying device. Mechanical conveying devices or pneumatic conveying devices are employed for this purpose. Pneumatic conveying devices convey the granular material by means of a blower through connecting lines from the storage container, for example through a distribution device and a plurality of lines connected there, to the respective output units. The supply of the granular material from the at least one storage container into the conveying device is controlled by means of a metering device.

A pneumatic conveying device of the type mentioned at the outset and an agricultural distribution device is known from U.S. Pat. No. 4,779,765 A. A volumetric air flow generated by a blower is distributed over two air supply lines, which serve for transporting granular material, which is fed to the respective air supply line by metering devices embodied as metering rollers.

SUMMARY

The present disclosure relates to a pneumatic conveying device for granular material, in particular seeds and/or fertilizer, including at least one blower having at least one outlet, to which a main air supply line is connected, into which flows an air volume flow generated by the blower, wherein the main air supply line leads into an air inlet of an air distribution device for controlling the volumetric air flow, wherein the air distribution device comprises a plurality number of air outlets, to which the respective one connecting line is connected, to which a metering device for supplying the granular material is connected. Furthermore, the present disclosure relates to an agricultural distribution device.

The pneumatic conveying device is characterized by a flexible adjustment of the air conveying quantities supplied to the air outlets with compact design at the same time, in particular in the longitudinal direction of the distribution device.

This is achieved through a pneumatic conveying device as claimed. Advantageous embodiments and further developments can be taken from the dependent claims thereof.

The pneumatic conveying device for conveying granular material, in particular seeds and/or fertilizer, includes a blower having at least one outlet to which at least one main air supply line is connected, into which flows a volumetric air flow generated by the blower. The at least one main air supply line leads into an air inlet of an air distribution device for controlling the volumetric air flow. The air distribution device comprises a number of air outlets that is even-numbered or divisible by the number three, to which the respective one connecting line is connected, to which a metering device for supplying the granular material is connected. It is provided that the air distribution device is embodied as a cylindrical housing with a rotary slide valve arranged therein, which is equipped for changing an outlet cross-section of the air outlets in order to manipulate the supplied volumetric air flow for transporting the granular material coming from the respective metering device.

This design makes it possible to adapt the volumetric air flow to different operating conditions. In particular, by integrating the rotary slide valve equipped for changing the outlet cross-section of the, in particular, substantially circular air outlets in the housing, a compact design can be achieved. In addition, the rotary slide valve makes possible a targeted distribution of the volumetric air flow over the air outlets, which ranges from a complete supply of all air outlets to a supply restricted to half or a third of the air outlets. Different distributions into part air flows in between are possible.

Preferably, an actuator can be arranged on the rotary slide valve by which the rotary slide valve can be manually or automatically actuated. The actuator can be embodied for example as an electric motor by way of which the position of the rotary slide valve relative to the air outlets can be varied. Alternatively, the actuator can be embodied as a lever to be manually actuated by an operating person.

In particular, the rotary slide valve can be embodied as an arcuate section pivotable about a longitudinal axis of the housing, which in sections comprises openings extending in the circumferential direction of the arcuate section, which dependent on a set pivot position of the arcuate section, interact with the air outlets of the housing. The arcuate section is arranged in the housing concentrically to the longitudinal axis of the same, so that the longitudinal axis is simultaneously the pivot axis of the rotary slide valve. By pivoting the arcuate section, the openings can be adjusted relative to the air outlets in the manner that all air outlets are completely open, i.e. the openings completely overlap the respective air outlet up to a partial overlap of half a number of the air outlets by the lateral surface of the rotary slide valve. In the first mentioned case, of the complete overlap, the volumetric air flow supplied by the blower is substantially evenly distributed over all air outlets. In the case of only a partial overlap, the ratio of the distribution of the supplied volumetric air flow can be varied as a function of the set pivot angle of the arcuate section about its pivot axis, which runs coaxially to the longitudinal axis of the housing.

Preferably, the rotary slide valve can be adjustable in discrete steps or continuously. An adjustment of the rotary slide valve in discrete steps has the advantage that predefined conditions of the distribution of the supplied volumetric air flow over the air outlets is adjustable. A continuous adjustment of the rotary slide valve makes possible a more precise adaptation of the distribution of the supplied volumetric air flow over the air outlets. For an adjustment of the ratio of the distribution of the supplied volumetric air flow in discrete steps the actuator embodied as lever can be locked on the housing in detent positions. For this purpose, a locking means can be provided. Alternatively, the electric motor can be embodied as a stepping motor which likewise makes possible adjusting the ratio in discrete steps.

Preferably, the housing can have a circular-cylindrical shape, as a result of which a compact configuration of the air distribution device is achieved. In particular, based on the main air supply line and on the connecting lines connected to the air outlets, which extend at least in sections substantially in a common direction, the housing can be arranged extending transversely to these. This arrangement of the housing running transversely to the connecting lines has the advantage that more installation space is available for arranging the metering devices.

Further preferably, the openings can have an extent in the circumferential direction of the section, which corresponds to at least twice the diameter of the outlet cross-section of the air outlets.

Further, the openings can have a width in the axial direction which corresponds at least to the diameter of the outlet cross-section of the air outlets or is less than this. By reducing some of the outlet cross-sections of the openings, less pronounced or differing flow resistances for example in different-length lines arranged in the following can be compensated for.

In a particular embodiment, the openings in the vicinity of a main air supply line can have a smaller opening cross-section or a smaller width than openings further distant from the main air supply line. With this embodiment, increased air flows, as occur in the near region of the main air supply line, can be reduced in order to achieve a more even air flow in all of the air outlets.

In particular, the openings can have a substantially elliptical opening cross-section. An elliptical opening cross-section is to mean in particular such as have a different width and extend along the circumferential direction, such as for example an elongated hole.

Preferably, the openings, seen in the circumferential direction of the rotary slide valve, can be arranged with an alternating offset in the circumferential direction relative to one another. The opening cross-sections of two directly adjacent openings have a common overlap region in the circumferential direction.

According to a preferred further development, the air outlets can be arranged next to one another on the housing axially parallel to the longitudinal axis of the same. Thus, attaching and installing the connecting lines is simplified. Likewise, connecting the metering devices to the connecting lines is also simplified by this.

In particular, the at least one main air supply line can be arranged on the housing located opposite the air outlets or coaxially to the housing. The main air supply line and the connecting lines arranged on the air outlets can thus be arranged sections lying in a common plane in sections, which likewise has a positive effect on the installation space requirement of the pneumatic conveying device. The main air supply line, based on the center of the housing, can be arranged symmetrically or asymmetrically on the same. A coaxial connection of the main air supply line to an end of the housing is advantageous in particular when the housing at the same time forms a preferentially load-bearing part of a machine frame.

According to a further development, the air outlets can be arranged in pairs next to one another or in a group of three, wherein the distance of the air outlets of at least one pair or of a group of three among one another is smaller than the distance to an adjacent pair or a group of air outlets. In particular, with metering devices arranged in cascades in the following an arrangement by groups of lines and thus their associated air outlets is advantageous.

In particular, two of the metering devices in conveying direction can be arranged downstream of each pair of air outlets, wherein both metering devices are connectible to both connecting lines assigned to the respective air outlets, in order to optionally supply the material of a metering device or both metering devices to one connecting line or both connecting lines.

For this purpose, each metering device can comprise a change-over element actuatable manually or by an actuator, which connects or disconnects the respective metering device to/from one or both connecting lines. For example, the metering devices can comprise change-over elements embodied as change-over flaps, through which alternatively a supply of the material to only one of the connecting lines or to both connecting line is possible. The metering devices in turn are embodied switchable, so that all connecting lines can charged with material by only half of the metering devices.

Furthermore, the object set at the outset is achieved by an agricultural distribution machine for conveying granular material taken from at least one storage container with a pneumatic conveying device, which is configured as claimed. Reference may be made to all embodiments of the pneumatic conveying device proposed.

The present invention is explained in more detail in the following by way of an exemplary embodiment shown in the drawings.

DETAILED DESCRIPTION

Figure 1:
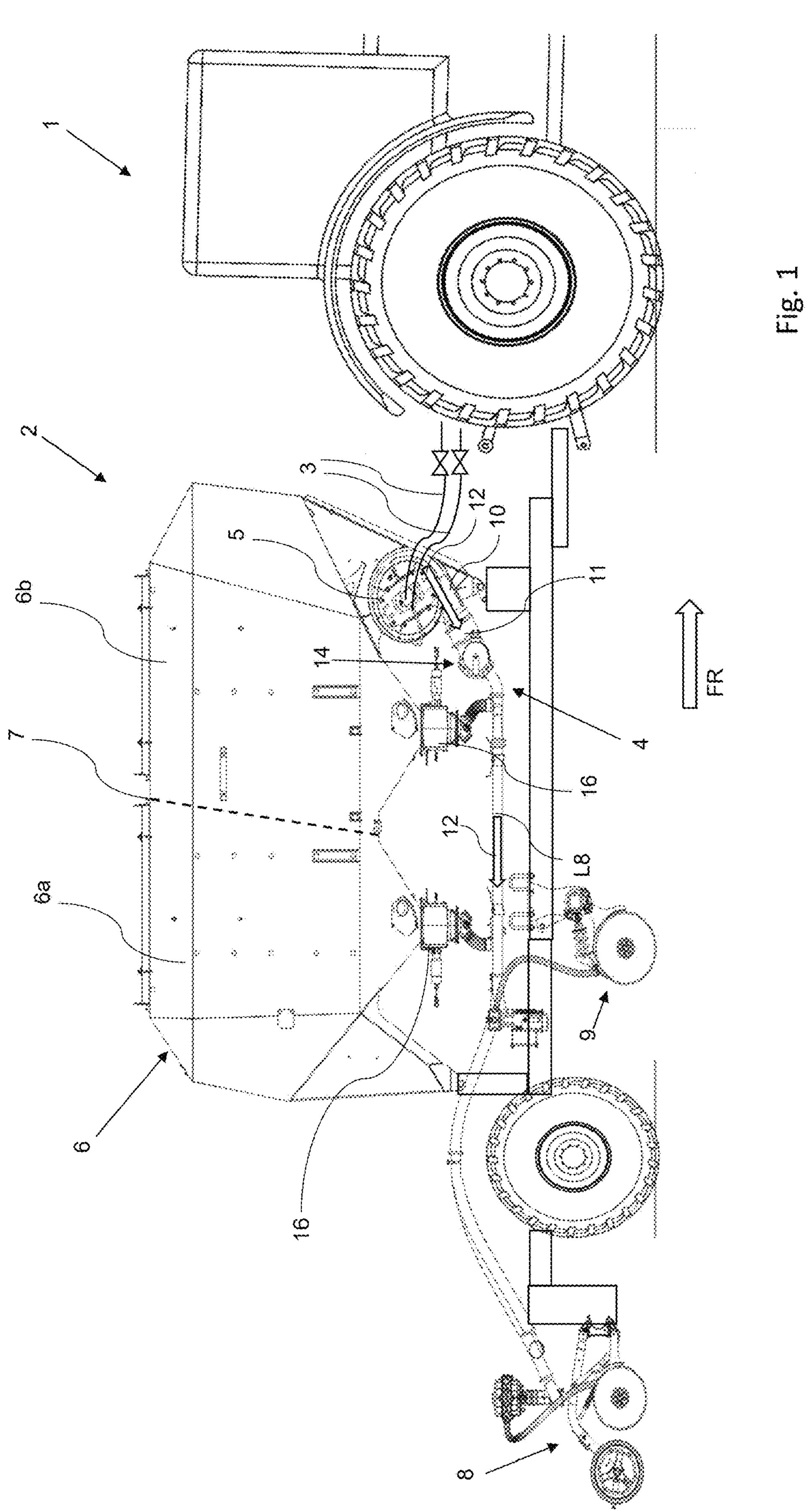
FIG. 1 shows a schematic representation of a traction vehicle and an agricultural distribution machine.

In FIG. 1, a schematic representation of a traction vehicle 1, in particular of a tractor, and an agricultural distribution machine 2 arranged thereon is shown. The traction vehicle 1 serves for moving the distribution machine 2 in a travelling direction over an area to be worked and to supply the same with drive energy. Purely exemplarily, two supply lines 3 are shown which serve for providing a hydraulic fluid and/or electrical energy for driving an in particular hydraulically driven blower 5 of a pneumatic conveying device 4 of the distribution device 2. The distribution machine 2 comprises a storage container 6, which is divided into two segments **6*a*, 6*b* by a separating wall 7. Alternatively, two separate storage containers 6 can be provided. Granular material, in particular seeds and/or fertilizer which is spread by the distribution machine 2 is located in the storage container 6. The granular material is conveyed by the pneumatic conveying device 4 to dispensing units 8, 9, which place the granular material in the ground. The respective dispensing unit 8 can comprise one or more seed coulters, while the respective dispensing unit 9 comprises one or more fertilizer coulters. A number of dispensing units 8, 9** that is even or divisible by 3 is provided.

The blower 5 is provided with at least one outlet 10 to which at least one main air supply line 11 is connected, into which a volumetric air flow 12 generated by the blower 5 flows. The at least one main air supply line 11 leads into an air inlet 13 of an air distribution device 14 for distributing the volumetric air flow 12. The air distribution device 14 has an even number of air outlets, to which the respective one connecting line L1, L2, . . . . L8 is connected.

From the individual segments 6*a* of the storage container 6, the granular material is fed to the individual connecting lines L1, L2, . . . . L8 of the conveying device 4 by means of metering devices 16. A precise metering of the quantity of the material to be conveyed by the conveying device 4 to dispensing units 8, 9 takes place by the metering devices 16. The metering devices 16 are arranged under the storage container 6 between the storage container 6 and the connecting lines L1, L2, . . . . L8 of the conveying device 4. According to the agricultural distribution machine 2 shown in FIG. 1, the granular material is substantially fed by gravity from the respective segments 6*a*, 6*b* of the storage container 6 to the respective metering device 16. The metering devices 16 can be divided into two or more groups G1, G2, wherein each group G1, G2 includes a number of metering devices 16 corresponding to half the number of connecting lines L1, L2, . . . . L8. The group G1 with metering devices 16 is directly arranged behind the air distribution device 14. Seen in conveying direction FR of the granular material, the group G2 with metering devices 16 is arranged directly downstream of the same.

The connecting lines L1, L3, L5 and L7 can be assigned to the group G2 which are supplied by the metering devices 16 of the group G2 with the seeds to be conveyed pneumatically. The connecting lines L2, L4, L6 and L8 can be assigned to the group G1, which is supplied with the fertilizer to be conveyed pneumatically by the metering devices 16 of the group G1.

Figure 2:
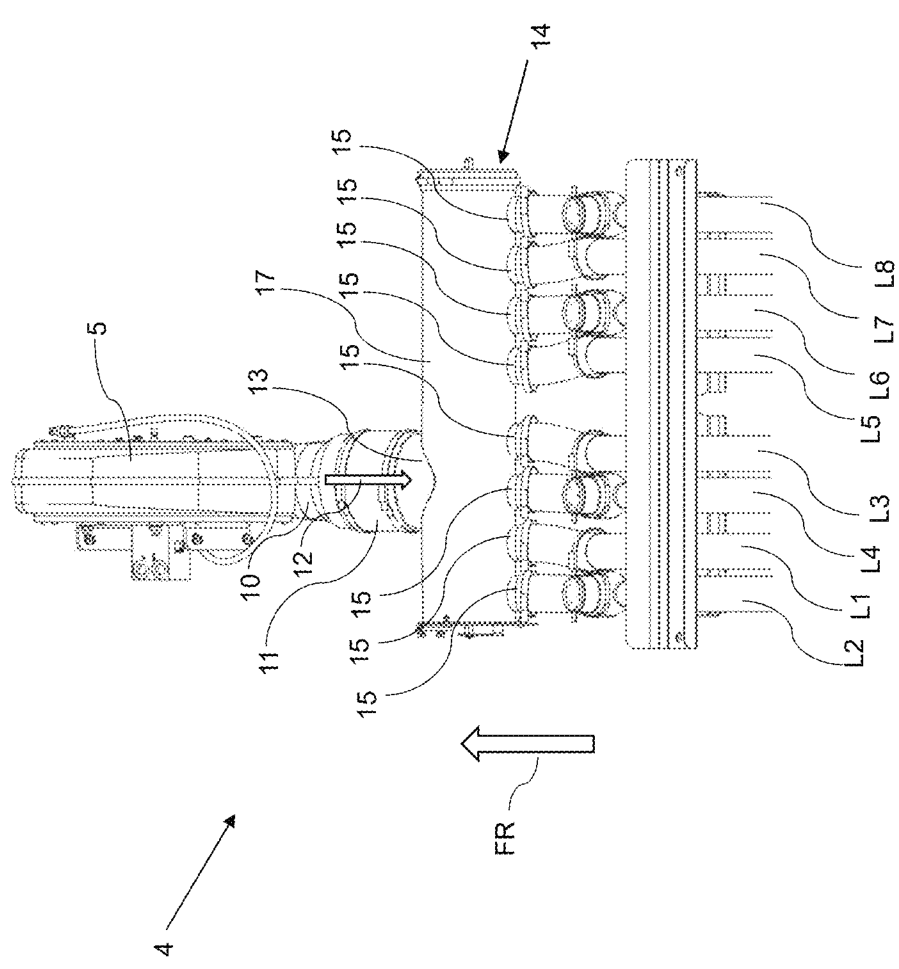
FIG. 2 shows a part view of a pneumatic conveying device.
Figure 3:
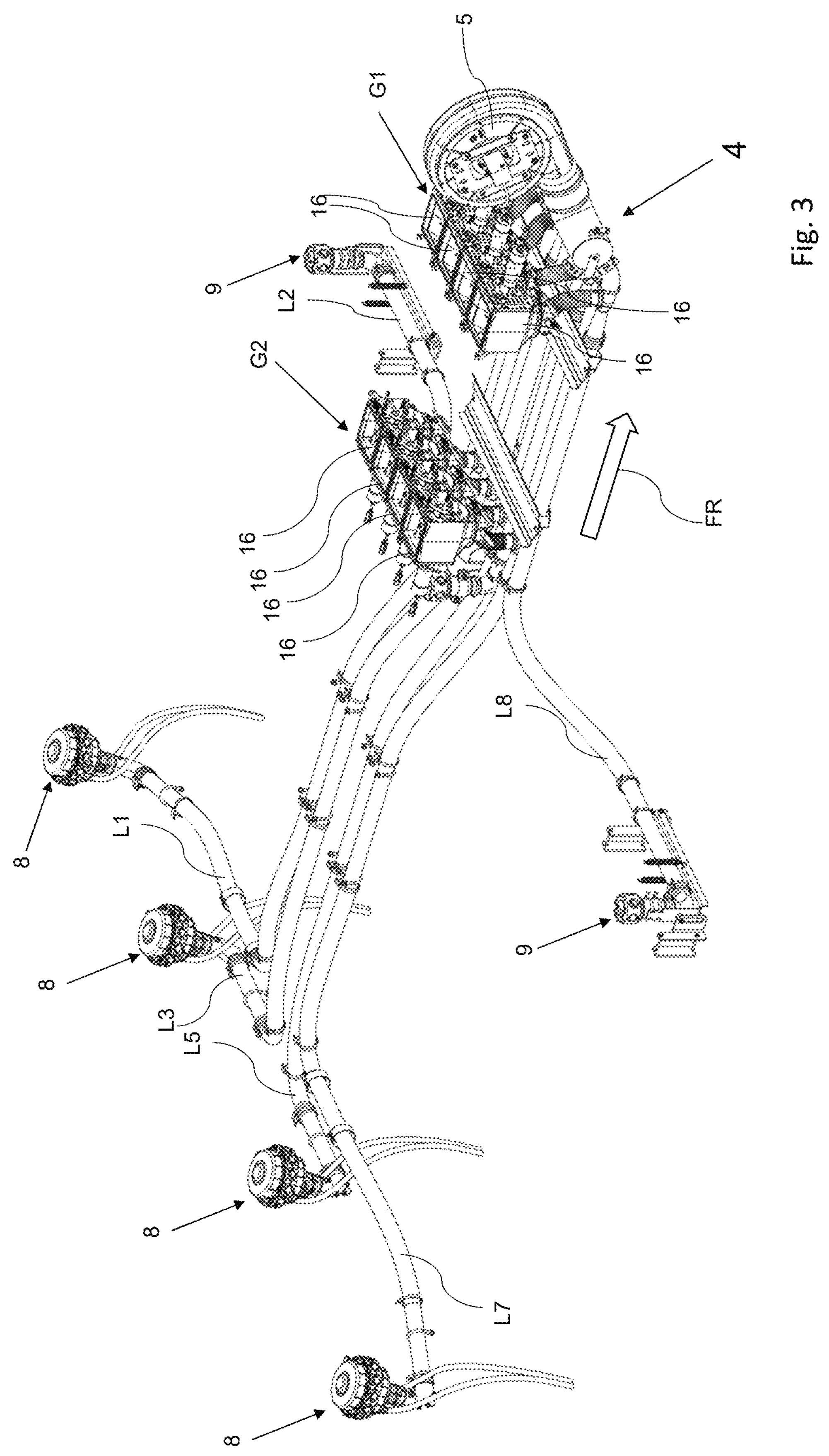
FIG. 3 shows a perspective part view of the pneumatic conveying device according to FIG. 2.

In FIG. 2, a part view of the pneumatic conveying device 4 in a view from above is shown. The representation in FIG. 3 shows a perspective part view of the pneumatic conveying device 4 according to FIG. 2.

The air distribution device 14 includes a cylindrical housing 17. The housing 17 of the air distribution device 14, based on the main air supply line 11 and the connecting lines L1, L2, . . . . L8 which are connected to the air outlets 15, which substantially run facing in a common direction at least in sections, is arranged running transversely to these. The connecting lines L1, L2, . . . . L8 run in the longitudinal direction of the distribution machine 2 in sections. Preferably, the housing 17 has a circular-cylindrical shape. The arrangement of the air distribution device 14 oriented transversely to the longitudinal axis of the distribution machine 2 makes possible an installation space-optimized arrangement of the same and of further components of the pneumatic conveying device 4 such as for example of the housing 5, which becomes clear in particular from FIG. 1.

Figure 4:
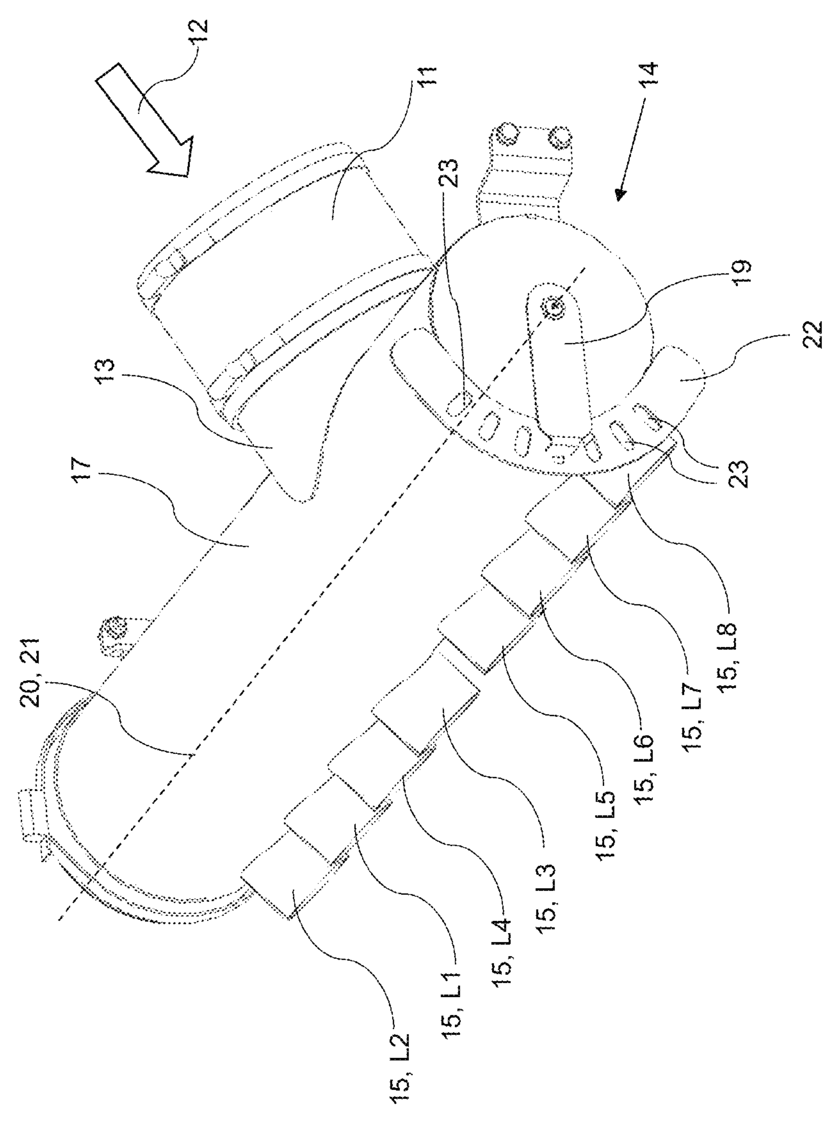
FIG. 4 shows a perspective view of an air distribution device.

The representation in FIG. 4 shows a perspective view of the air distribution device 14. The air distribution device 14 is embodied as the cylindrical housing 17 with a rotary slide valve 20 arranged therein, as is explained in more detail in the following FIGS. 5 to 8. The rotary slide valve 18 arranged in the housing 17 is equipped for changing an outlet cross-section of the air outlets 15 in order to manipulate the supplied volumetric air flow 12 for transporting the granular material coming from the respective metering device 16. For actuating the rotary slide valve 18, an actuator embodied as lever 19 is pivotably fastened to the rotary slide valve 18 about a pivot axis 21 that is coaxial to the longitudinal axis 20 of the housing 17. In order to fix the rotary slide valve 18 in a defined position, a ring segment-shaped section 22 is arranged adjacently to the lever 19 on the housing outside 17. The ring segment-shaped section 22, based on the pivot axis 21, comprises openings 23 extending in the radial direction, for example in the form of elongated holes. At the free end of the lever 19, a detent lug—which is not visibly shown—is arranged, which can be brought into engagement with one of the openings 23 in order to position the rotary slide valve 18 in a desired position. Depending on the position of the lever 19 respectively of the rotary slide valve 18, the volumetric air flow 12 is divided into part volumetric flows 28, 29 which is still explained in more detail further down below.

Figure 5:
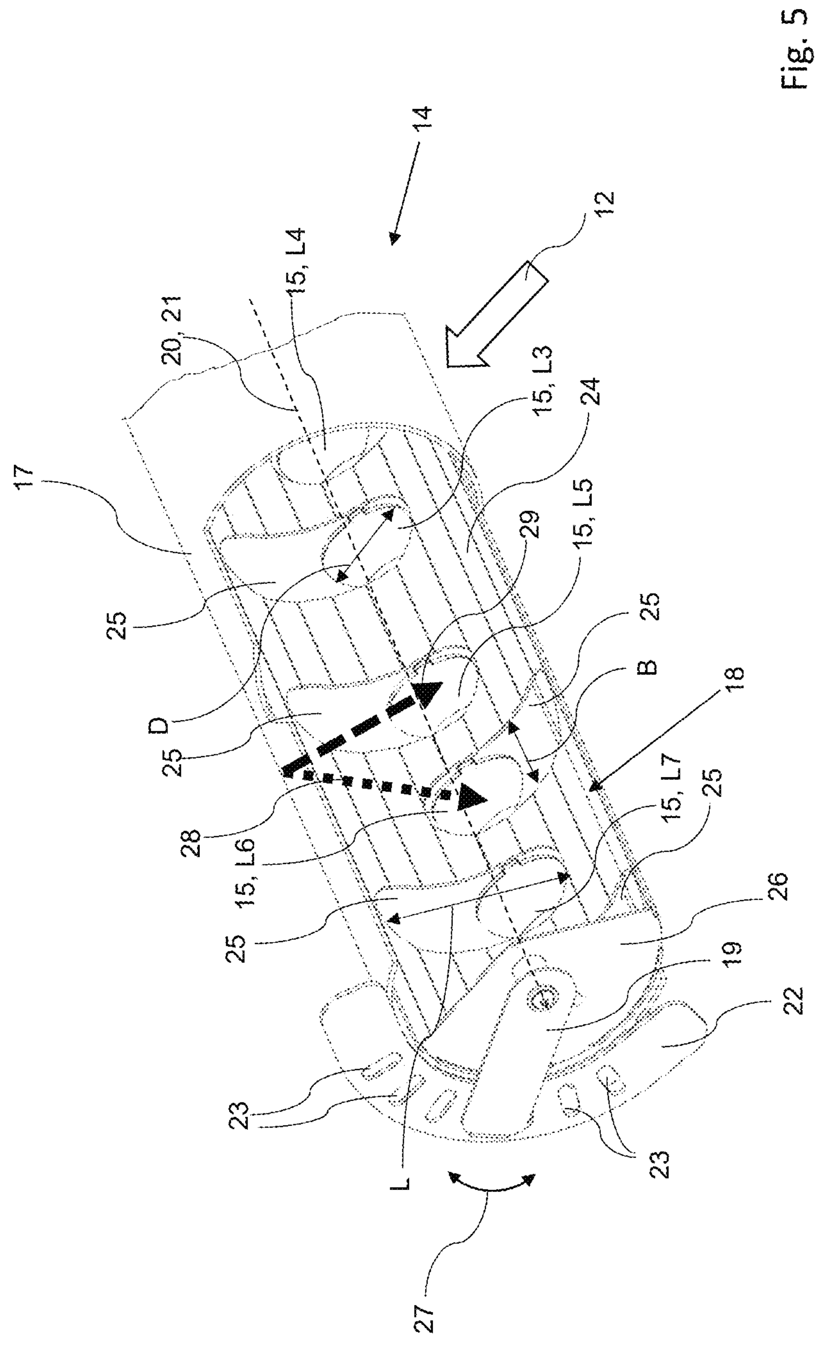
FIG. 5 shows a schematic part sectional view of the air distribution device according to FIG. 4 in a first exemplary switching position.

In FIG. 5, a schematic part sectional view of the air distribution device 14 according to FIG. 4 is shown in a first switching position of the rotary slide valve 18. The rotary slide valve 18 is embodied as an arcuate section 24 that is pivotable about the longitudinal axis 20 of the housing 17. Both the housing 17 and also the rotary slide valve 18 or its arcuate or cylinder segment-shaped section can also be embodied as a polygonally folded sheet metal cutting. Like a polygon, the number of the folds preferably approximate a circular shape. The arcuate section 24 comprises openings 25 which in sections extend in the circumferential direction of the section 24, which depending on the set position, i.e. of the pivot angle of the arcuate section 24 set by the actuator, interact with the air outlets 15 of the housing 17. In the axial direction, at least one circular sector-shaped section 26 is arranged on the arcuate section 24. The lever 19 non-rotatably acts on one of the two circular sector-shaped sections 26 in order to be able to pivot the lever together with the arcuate section 24 about the pivot axis 21 in the pivot direction 27.

As shown in FIGS. 4 to 8, the rotary slide valve 18 can be adjusted in the pivot direction 27 in discrete steps in particular manually. The step width, i.e. the distance of the openings 23 in the circumferential direction relative to one another determines the ratio of the distribution of the supplied volumetric air flow 12. Alternatively, the rotary slide valve 18 can be continuously adjustable. For this purpose, an actuator embodied for example as electric motor can be arranged on one of the circular sector-shaped sections 26. In particular, the actuator embodied as electric motor can bring about an automatic adjustment. Accordingly, a control command can be generated by a control unit of the traction vehicle 1 or of the distribution machine 2, which serves for controlling the actuator, in order to adjust a pivot angle, which corresponds to a ratio of the division of the volumetric air flow 12 into the part volumetric flows 28, 29 specified by an operating person.

In the circumferential direction of the arcuate section 24, the openings 25 have an extent L, which corresponds to at least twice a diameter D of the outlet cross-section of the air outlets 15. In the axial direction, the openings 25 have a width B which corresponds at least to the diameter D of the outlet cross-section of the air outlets 25. Preferably, the openings 25 have a substantially elliptical opening cross-section.

Seen in the circumferential direction of the rotary slide valve 18 respectively of the arcuate section 24, the openings 25 are arranged with an alternating offset in the circumferential direction relative to one another. The air outlets 15 are arranged next to one another axially parallel to the longitudinal axis 20 of the housing 17 on the same. The air outlets 15 are arranged next to one another in pairs, wherein the distance of the air outlets 15 among a pair is less than the distance to an adjacent pair of air outlets 15. In the shown exemplary embodiments, four outlets 15 each with connecting lines L8, L7, L6, L5 arranged on these are arranged in groups with same axial distance to one another. The further four air outlets 15, with connecting lines L1, L2, L3, L4 arranged on these, are likewise arranged with same axial distance to one another in groups. Between the central air outlets 15, on which the connecting lines L5 and L3 are arranged, there is a greater axial distance. In addition, the air outlets 15 with the connecting lines L8, L7, L6, L5 can be arranged mirror-symmetrically to the air outlets 15 with the connecting lines L1, L2, L3, L4. This offers advantages in the hose routing. Each pair of air outlets 15 is assigned to correspondingly arranged openings 25 of the arcuate section 24 in each case, wherein the openings 25, seen in the circumferential direction, extend in the opposite direction, i.e. are arranged offset to one another. Each two openings 25 assigned to a pair of air outlets 15 have a common overlap region, in which both air outlets 15 of a pair are completely opened, as is evident from FIG. 5.

Representative for all air outlets 15 arranged in pairs, the division of the volumetric air flow 12 into two proportional part volumetric flows 28 and 29 by the rotary slide valve 18 for a pair of air outlets 15 is shown in FIG. 5. The lever 19 is situated in a center position, in which all air outlets 15 are completely opened by the openings 25. Accordingly, the supplied volumetric air flow 12 is evenly distributed over all air outlets 15, wherein each of the connecting lines L1, L3, L5 and L7 as well as L2, L4, L6 and L8 is supplied with identical-size part volumetric flows 28 for fertilizer or part volumetric flows 29 for seed. Based on the air outlets 15 arranged in pairs, there is a division of the volumetric air flow 12 in a ratio of substantially 50:50.

Figure 6:
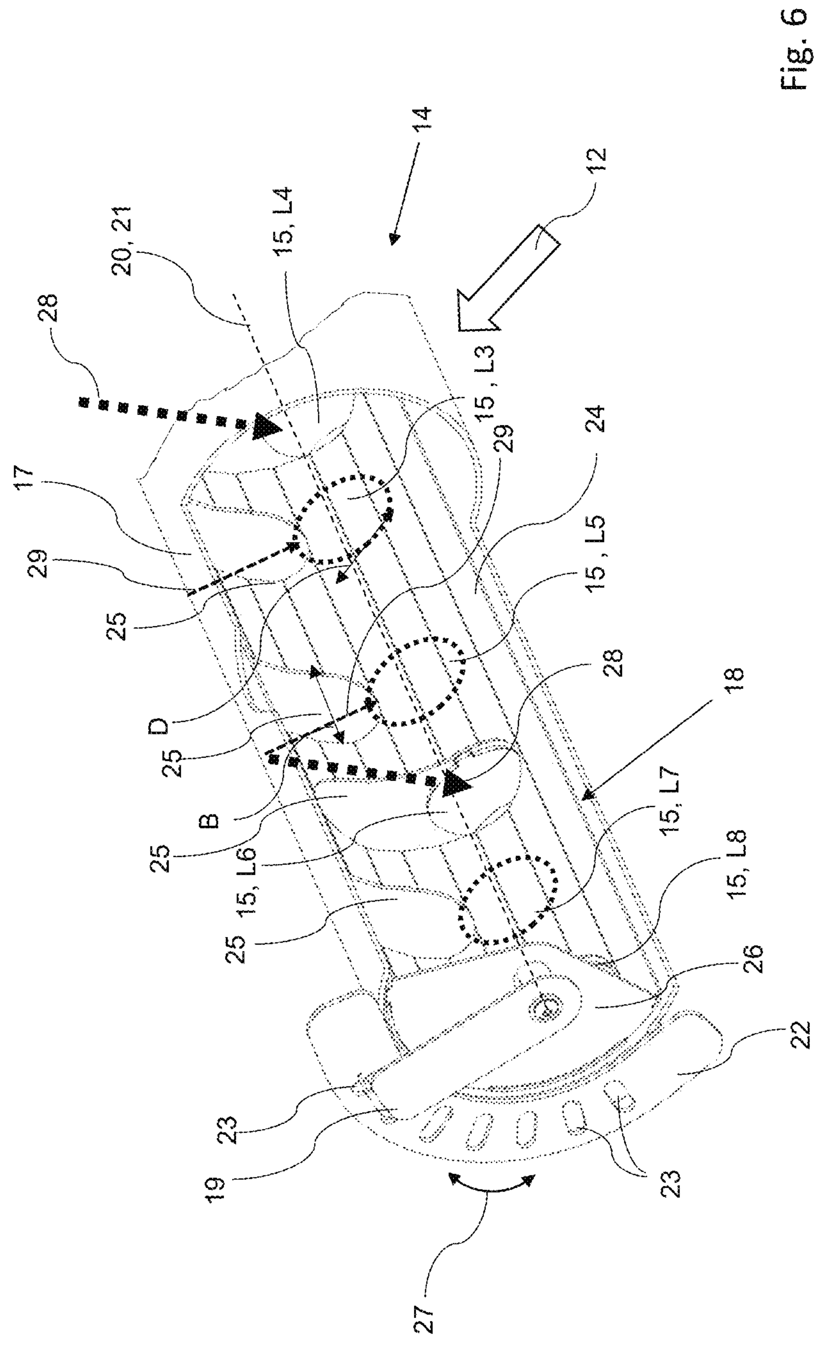
FIG. 6 shows a schematic part sectional view of the air distribution device according to FIG. 4 in a second exemplary switching position.

The representation in FIG. 6 shows a schematic part sectional view of the air distribution device 14 according to FIG. 4 in a second exemplary switching position. As is evident from the position of the lever 19, the rotary slide valve 18 has been moved in a pivot direction 27, in which the air outlets 15, to which the connecting lines L1, L3, L5 and L7 are connected, are substantially covered by the lateral surface of the rotary slide valve 18, while the air outlets 15, to which the connecting lines L2, L4, L6 and L8 are connected, continue to be fully open. Based on the air outlets 15 arranged in pairs, there is a division of the volumetric air flow 12 into the respective part flows 28 and 29 in a ratio of approximately 90:10.

Figure 7:
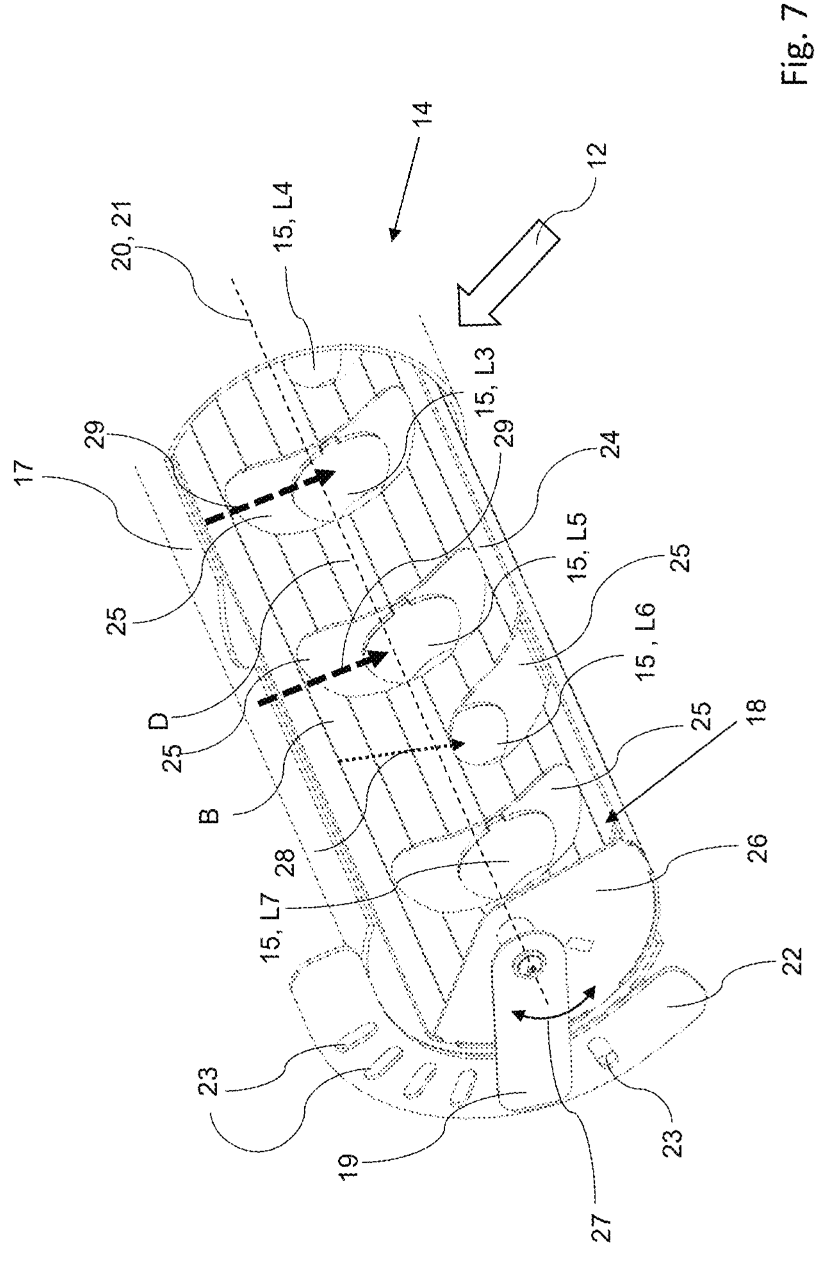
FIG. 7 shows a schematic part sectional view of the air distribution device according to FIG. 4 in a third exemplary switching position.

In FIG. 7, a schematic part sectional view of the air distribution device according to FIG. 4 is shown in a third exemplary switching position. As is evident from the position of the lever 19, the rotary slide valve 18 has been moved in a pivot direction 27, in which the air outlets 15, to which the connecting lines L1, L3, L5 and L7 are connected, continue to be fully open, while the air outlets 15, to which the connecting lines L2, L4, L6 and L8 are connected, are covered in sections by the lateral surface of the rotary slide valve 18. Based on the air outlets 15 arranged in pairs, there is a division of the volumetric air flow 12 into the respective part flows 28 and 29 in a ratio of approximately 30:70.

Figure 8:
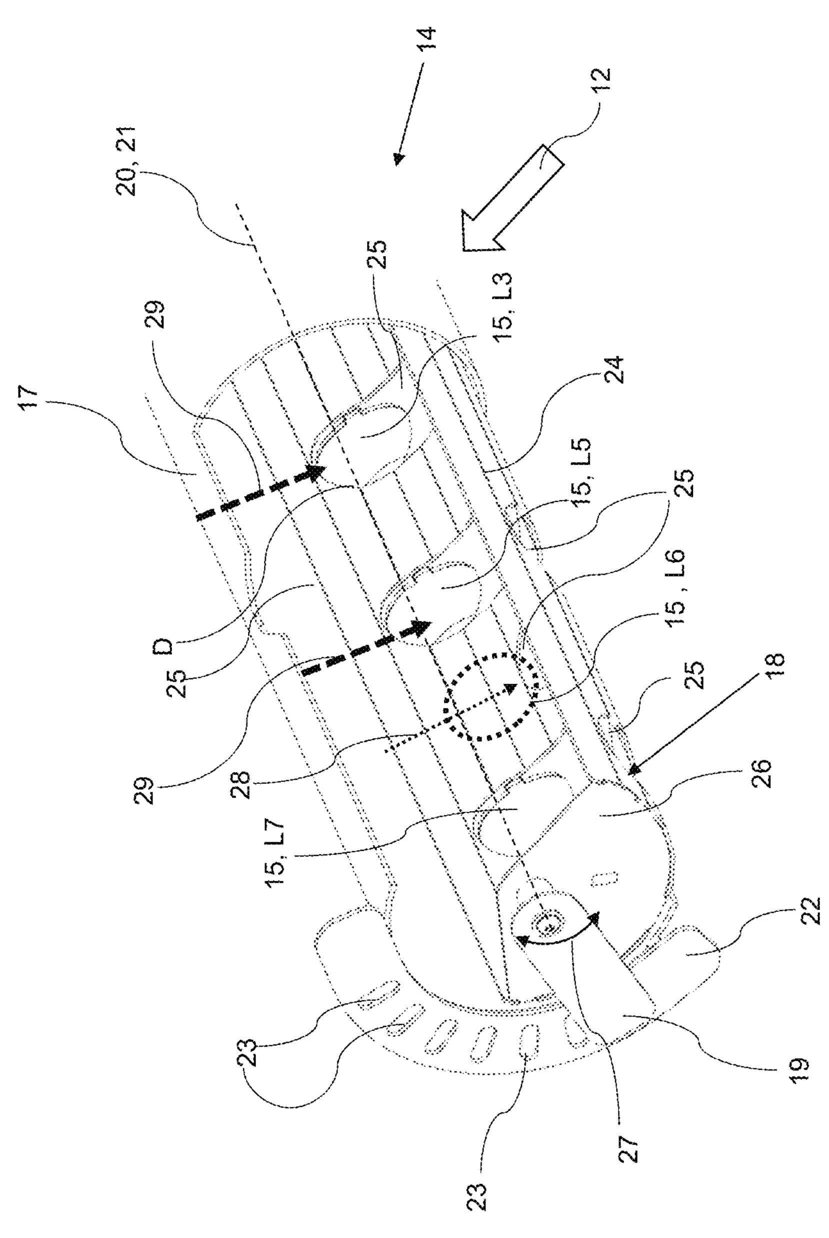
FIG. 8 shows a schematic part sectional view of the air distribution device according to FIG. 4 in a fourth exemplary switching position.

The representation in FIG. 8 shows a schematic part sectional view of the air distribution device 14 according to FIG. 4 in a fourth exemplary switching position. As is evident from the position of the lever 19, the rotary slide valve 18 has been moved in a pivot direction 27, in which the air outlets 15, to which the connecting lines L2, L4, L6 and L7 are connected, are substantially covered by the lateral surface of the rotary slide valve 18 while the air outlets 15, to which the connecting lines L1, L3, L5 and L7 are connected, continue to be completely open. Based on the air outlets 15 arranged in pairs, there is a division of the volumetric air flow 12 into the respective part flows 28 and 29 in a ratio of approximately 10:90.

As already explained further up, the exemplary adjusting possibilities were described in FIGS. 5 to 8 by way of the adjustment of the actuator embodied as lever 19 in the pivot direction 27 performed in discrete steps about the pivot axis 21. A continuous adjustment by means of an actuator embodied as electric motor is likewise conceivable, from which, besides an automation of the adjustment or setting, a finer grading of the division into the respective part flows 28 and 29 can be achieved.

LIST OF REFERENCE NUMBERS

1 Traction vehicle
2 Distribution machine
3 Supply line
4 Conveying device
5 Blower
6 Storage container
6*a* Segment
6*b* Segment
7 Separating wall
8 Dispensing unit
9 Dispensing unit
10 Outlet
11 Main air supply line
12 Volumetric air flow
13 Air inlet
14 Air distribution device
15 Air outlet
16 Metering device
17 Housing
18 Rotary slide valve
19 Lever
20 Longitudinal axis
21 Pivot axis
22 Ring segment-shaped section
23 Opening
24 Arcuate section
25 Opening
26 Circular sector-shaped section
27 Pivot direction
28 Part volumetric flow
29 Part volumetric flow
B Width of 25
D Diameter of 15
L Extent of 25
FR Conveying direction
G1 Group
G2 Group
L1 Connecting line
L2 Connecting line
L3 Connecting line
L4 Connecting line
L5 Connecting line
L6 Connecting line
L7 Connecting line
L8 Connecting line

The invention claimed is:

1. A pneumatic conveying device (4) for conveying a granular material, comprising:

a blower (5) having an outlet (10);

a main air supply line (11) connected to the outlet (10) and configured to receive a volumetric air flow (12) generated by the blower (5);

an air distribution device (14) having a cylindrical housing (17); and a rotary slide valve (18) arranged in the cylindrical housing (17), wherein the main air supply line (11) leads into an air inlet (13) of the cylindrical housing (17), wherein the cylindrical housing (17) has a number of air outlets (15), wherein the number of the air outlets (15) is even or divisible by three, wherein a connecting line (L1, L2, L3, . . . L8) is connected to each of the air outlets (15), wherein a metering device (16) for supplying the granular material is connected to each connecting line (L1, L2, L3, . . . L8), wherein the rotary slide valve (18) includes a plurality of openings (25) for changing an outlet cross-section of the air outlets (15) in order to manipulate the volumetric air flow (12) for transporting the granular material coming from the respective metering device (16).

2. The pneumatic conveying device (4) as in claim 1, wherein the pneumatic conveying device (4) is configured to convey seeds and/or fertilizer.

3. The pneumatic conveying device (4) according to claim 1, wherein an actuator (19) is arranged on the rotary slide valve (18), and wherein the rotary slide valve (18) is manually or automatically actuatable via the actuator (19).

4. The pneumatic conveying device (4) according to claim 1, wherein the rotary slide valve (18) has an arcuate section (24) pivotable about a longitudinal axis (20) of the housing (17), wherein the openings (25) extend in a circumferential direction of the arcuate section (24) in sections, and wherein the openings (25) interact with the air outlets (15) of the housing (17) depending on a set pivot position of the arcuate section (24).

5. The pneumatic conveying device (4) according to claim 1, wherein the rotary slide valve (18) is adjustable in discrete steps or continuously.

6. The pneumatic conveying device (4) according to claim 1, wherein the housing (17) has a circular-cylindrical shape.

7. The pneumatic conveying device (4) according to claim 4, wherein the openings (25) in the circumferential direction of the arcuate section (24) have an extent (L) which corresponds to at least twice a diameter (D) of the outlet cross-section of the air outlets (15).

8. The pneumatic conveying device (4) according to claim 4, wherein the openings (25) have a width (B) in an axial direction, and wherein the width (B) corresponds to or exceeds a diameter (D) of the outlet cross-section of the air outlets (15) or is less than the diameter (D) of the outlet cross-section.

9. The pneumatic conveying device (4) according to claim 4, wherein the openings (25) in a vicinity of the main air supply line (11) have a smaller opening cross-section or a smaller width (B) than the openings (25) further distant from the main air supply line (11).

10. The pneumatic conveying device (4) according to claim 4, wherein the openings (25) have a substantially elliptical opening cross-section.

11. The pneumatic conveying device (4) according to claim 4, wherein the openings (25), seen in the circumferential direction of the rotary slide valve (18), are arranged with an alternating offset in the circumferential direction relative to one another.

12. The pneumatic conveying device (4) according to claim 1, wherein the air outlets (15) are arranged axially parallel to a longitudinal axis (20) of the housing (17) next to one another on the housing (17).

13. The pneumatic conveying device (4) according to claim 11, wherein the main air supply line (11) is arranged located opposite the air outlets (15) on the housing (17) or coaxially to the housing (17).

14. The pneumatic conveying device (4) according to claim 11, wherein the air outlets (15) are arranged in pairs next to one another or in a group of three, wherein a distance of the air outlets (15) among at least one pair or one group is smaller than a distance to an adjacent pair or group of air outlets (15).

15. The pneumatic conveying device (4) according to claim 14, wherein two metering devices (16) each are arranged downstream in a conveying direction (FR) of each pair of air outlets (15), and wherein the two metering devices (16) are connectible to both connecting lines (L1, L2, L3, . . . L8) assigned to respective air outlets (15) to optionally supply the granular material of one of the two metering devices (16) or both of the two metering devices (16) to one connecting line (L1, L2, L3, . . . L8) or both connecting lines (L1, L2, L3, . . . L8).

16. The pneumatic conveying device (4) according to claim 15, wherein each metering device (16) comprises a change-over element actuatable manually or by an actuator, and wherein the change-over element connects or disconnects the respective metering device (16) to/from one or both connecting lines (L1, L2, L3, . . . L8).

17. An agricultural distribution machine (2) for conveying granular material taken from at least one storage container (6), comprising a pneumatic conveying device (4), wherein the pneumatic conveying device (4) comprises a blower (5) having an outlet (10);

a main air supply line (11) connected to the outlet (10) and configured to receive a volumetric air flow (12) generated by the blower (5);

an air distribution device (14) having a cylindrical housing (17); and a rotary slide valve (18) arranged in the cylindrical housing (17), wherein the main air supply line (11) leads into an air inlet (13) of the cylindrical housing (17), wherein the cylindrical housing (17) has a number of air outlets (15), wherein the number of the air outlets (15) is even or divisible by three,
wherein a connecting line (L1, L2, L3, . . . L8) is connected to each of the air outlets (15),
wherein a metering device (16) for supplying the granular material is connected to each connecting line (L1, L2, L3, . . . L8),
wherein the rotary slide valve (18) includes a plurality of openings (25) for changing an outlet cross-section of the air outlets (15) in order to manipulate the volumetric air flow (12) for transporting the granular material coming from the respective metering device (16).

* * * * *